US006527247B1

(12) United States Patent
Jacob

(10) Patent No.: US 6,527,247 B1
(45) Date of Patent: Mar. 4, 2003

(54) ARTICLE SUPPORT STAND

(76) Inventor: Daniel Jacob, 48370 Sawleaf St., Fremont, CA (US) 94539

( * ) Notice: Subject to any disclaimer, the term of this patent is extended or adjusted under 35 U.S.C. 154(b) by 0 days.

(21) Appl. No.: 09/915,526

(22) Filed: Jul. 27, 2001

(51) Int. Cl.[7] .............................................. A47B 97/00
(52) U.S. Cl. ...................... 248/918; 248/444; 248/447
(58) Field of Search ................... 248/918, 444, 248/444.1, 441.1, 447, 442.2, 301, 304, 500, 670, 680, 188.1

(56) References Cited

U.S. PATENT DOCUMENTS

| | | | | | |
|---|---|---|---|---|---|
| 819,910 | A | * | 5/1906 | Myers | |
| 919,923 | A | * | 4/1909 | McNatt | |
| 1,060,795 | A | * | 5/1913 | Smith | |
| 2,046,134 | A | * | 6/1936 | Ryang | 45/121 |
| 2,104,072 | A | * | 1/1938 | Carr | 248/194 |
| 2,274,888 | A | * | 3/1942 | Coppock | 120/28 |
| 3,168,791 | A | * | 2/1965 | Nutting | 248/188.1 |
| 4,011,951 | A | * | 3/1977 | Boyer | 211/71 |
| 4,243,335 | A | * | 1/1981 | Singley | 400/718 |
| 4,582,285 | A | * | 4/1986 | Bello | 248/442.2 |
| 5,022,522 | A | * | 6/1991 | Kennedy | 206/387 |
| D324,882 | S | * | 3/1992 | Judd | D19/88 |
| 5,681,017 | A | * | 10/1997 | Clausen | 248/125.1 |
| 5,799,795 | A | | 9/1998 | Mease | 206/564 |
| 6,027,092 | A | | 2/2000 | Gordon | 248/444 |

* cited by examiner

Primary Examiner—Anita King
Assistant Examiner—Steven Marsh
(74) Attorney, Agent, or Firm—Palmer C. DeMeo

(57) ABSTRACT

An article support stand especially for use with a computer monitor. The article support stand has two adjustable, pivotable feet that are positioned adjacent to the monitor's base and are held down by anchors that are slidable along the feet. Each of the feet has a thin tongue portion that is tucked under the monitor base. The pivot for the feet of the article support stand is an upright post that also serves as the support for a horizontal beam that is rotatable around the post and slidable up and down thereon. An article holder (for holding, for example, a book or paper copy) is slidably attached to the horizontal beam and is tilted at a preferred angle suitable for reading. When not in use, the article holder can be rotated out of the way and positioned snug against the side of the monitor.

20 Claims, 4 Drawing Sheets

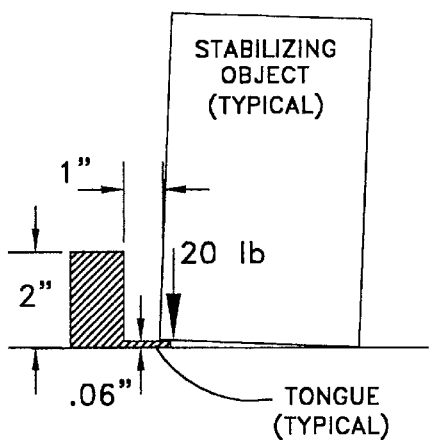
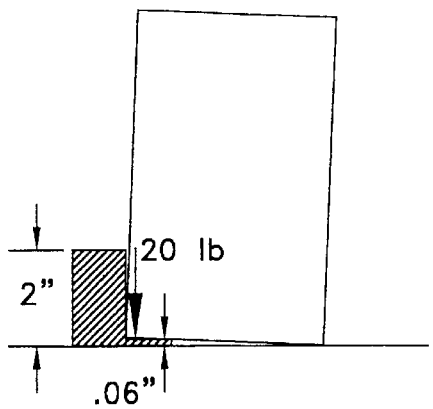
FIG.1 (PRIOR ART)    FIG.2 (PRIOR ART)
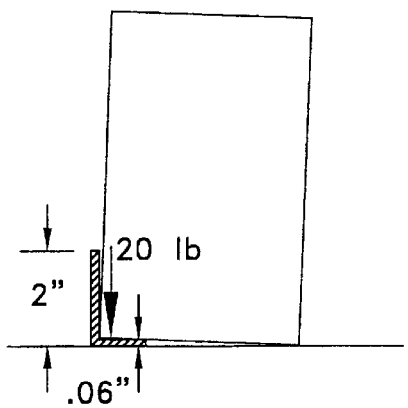
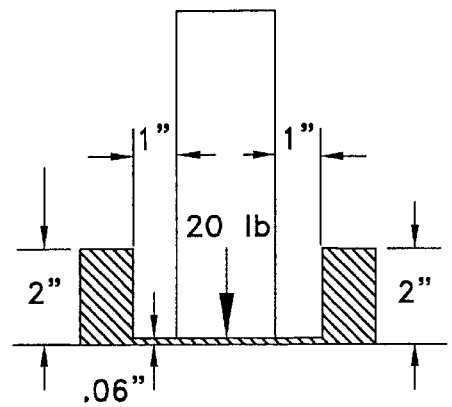
FIG.3 (PRIOR ART)   FIG.4 (PRIOR ART)

ARTICLE SUPPORT STAND

BACKGROUND OF THE INVENTION

1. Field of Invention

This invention relates generally to supports for an article and particularly to supports that rely on the weight of other objects for stability. More specifically, this invention relates to an article support stand for use with a computer monitor.

2. Description of Related Art

Some article supports are stable without any tie-down hardware, while others require some form of hardware to secure their base to a supporting surface to prevent them from toppling over. Yet a third kind of supports (hereinafter called "supports of the third kind") rely on the weight of another nearby object (hereinafter called "stabilizing object") for stabilization. In most cases concerning supports of the third kind the stabilizing object's weight is harnessed by sliding a portion of the stabilized support base (hereinafter called "tongue") between the bottom of the stabilizing object and its supporting surface. The stabilizing object must be of sufficient weight and positioned in such a way so as to provide a counter-moment equal to, or greater than, that attempting to topple over the support. The moments and counter-moments mentioned act around axes that are substantially parallel to the surface on which the support base rests.

The present invention corresponds to supports of the third kind cited above. Examples of supports of the third kind are portrayed in U.S. Pat. No. 3,168,791 issued to D. W. Nutting on Feb. 9, 1965, U.S. Pat. No. 4,582,285 issued to Bello on Apr. 15, 1986, U.S. Pat. No. 5,799,795 issued to Mease on Sep. 1, 1998 and U.S. Pat. No. 6,027,092 issued to Gordon on Feb. 22, 2000.

One problem associated with supports of the third kind is the need to raise at least a portion of the stabilizing object's base off its supporting surface in order to insert the tongue of a support under it. In many cases the base of an object is designed to engage the supporting surface equally around its base. For example, a computer monitor is designed to contact its supporting surface equally around its base. In the case of four-legged objects it's advantageous to have all four legs in contact with the supporting surface. When an object's base engages its supporting surface equally around its base, the contact pressure on the supporting surface is minimized. Conversely, when one side, or one corner of an object is raised off its supporting surface, only a small portion of the object's base remains in contacts with its supporting surface, and the contact pressure at the contacting locations increases substantially.

In many cases it is advantageous to minimize the contact pressure between an object and its supporting surface. For example, objects that reside on top of expensive, varnished desks: The larger the area of the object's base that contacts the desk surface, the less likely is the base to indent or leave a mark on the desk surface. The same holds true for object bases that rest on carpets: Minimizing the contact pressure on the carpet reduces the likelihood of damaging the carpet. In the case of four-legged stabilizing objects, the problem of raising one or two legs of such objects off their supporting surfaces is dramatized: If one of the object's legs is raised off its supporting surface, the object will not only rock, but the bulk of the object's weight will then be divided between two legs instead of four, putting evermore stress on the object's supporting surface.

To summarize, when an article support is to be stabilized by another stabilizing object by slipping a portion of the stabilized object's base underneath a portion of the stabilizing object's base thus significantly raising only a small portion of the stabilizing object's base, the stabilizing object's base no longer contacts its supporting surface equally as intended by its design, and contact pressures between the stabilizing object's base and its supporting surface increase substantially and may damage the supporting surface as described above. The term "significantly raising" means raised beyond the acceptable distortion of the object, or raised to a point that violates the design intent of the object. A design intent for a coffee table, for example, would be that its top surface remain substantially horizontal, at least to the extent that a cylindrical object, such as a round pen or pencil, would not roll off the table. Most wood and plastic objects are flexible to a certain extent, and the bases of such objects will distort slightly to conform to the supporting surface when raised unequally. Take a four-legged table on a wooden floor for example: Sliding a piece of paper under one leg will most probably not cause the table to rock and will only slightly redistribute the table's weight among the four legs. But sliding a piece of heavy cardboard under just one of the table's legs will cause most tables to rock. When an object rocks, or the corner of an object applies more force on its supporting surface than it normally should, the design intent of the object has been violated.

It can be seen from the above presentation that when a support relies on the weight of another object for stabilization by having a portion of the support's base, for example a tongue, positioned under the base of the stabilizing object, it is advantageous to make the tongue of the support base as thin as possible so as not to significantly violate the design intent of the stabilizing object.

Another problem associated with supports of the third kind is the fact that many surface-supported stabilizing objects have superstructures that have a larger footprint than their bases do. A computer monitor, for example, typically has a base that is smaller than the monitor itself when viewed from above. In order to slip the tongue of a support to be stabilized under such an object's base, the tongue must be made longer in order to reach the stabilizing object's base. The longer the tongue the more it is sutbject to bending stresses and deflections, and those particular types of stresses and deflections on the support's tongue are disadvantageous as will be shown in the following discussion.

When the relatively thin tongue of a support base is inserted under a stabilizing object, the following three cases may occur:

a) The tongue extends a certain distance away from the stabilizing object's edge as shown in FIG. 1, b) the portion of the tongue immediately adjacent to the stabilizing object's edge is much thicker (say more than ten times, for simplicity) than the thin portion of the tongue as shown in FIG. 2, or c) the thin portion of the tongue adjacent to the stabilizing object's edge abruptly changes direction upwards as shown in FIG. 3.

The dimensions and forces given in the figures represent a typical, real life situation. The 20 pound force is the force applied by the stabilizing object on the tongue of the stabilized support. To simplify calculations we will assume here that the depth of all objects in the figures is 1".

Using elementary stress and strain analysis and assuming that 1) the thin portion in FIG. 1 acts approximately as a cantilevered beam, and that 2) the tongue material is steel, approximate calculations will show that the upward movement of the vertical portions of the supports in question are respectively:

Case a) 0.012" (in bending),
Case b) 0.00003" (in shear), and
Case c) 0.00006" (in shear and tension).

From the above results we can see that in case (a), where a 1" portion of the tongue is not inserted under the stabilizing object, the upward movement of the support is about 400 times that of case (b) and about 200 times that of case (c).

One could argue that the deflection in case (a) is still very small, but it should be understood here that the above numbers illustrate the relative amount of motion between the three cases. In other words, for a given tongue thickness configured to work as in case (a), changing the configuration to work as in case (b) or (c) would allow us to use a much thinner tongue for a support.

FIG. 4 is a schematic representation of Nutting's support being stabilized by the leg of a bench. It should be noted here that in the case of Nutting's base, for approximate calculations it is assumed that the thin portion of the base acts as a beam in bending freely supported at both ends. The deflection (movement) in this case is estimated to be about half that of case (a) or 0.006", but still orders of magnitude larger than cases (b) and (c) above where there are no bending stresses.

The above numbers dramatically illustrate that if the portion of a base designed to be inserted under a stabilizing object is to be made as thin as possible, then it would be very advantageous to avoid any bending stresses on the tongue of a support base. Conversely, it would be advantageous to design the base in such a way that the tongue would be subject only to shear and tensile stresses as in cases (b) and (c) above.

Nutting teaches us in U.S. Pat. No. 3,168,791 that a support can be made very stable by having the leg of a bench, desk or bed act on the floor-plate (herein called "tongue) of the support. This is indeed true, however it requires that plate 18 of Nutting's base be quite thick otherwise it would bend and cause the entire stand to flex. The reason Nutting's plate 18 must be thick is because the leg mentioned acts at a distance from arms 16 and applies a bending moment to plate 18 resulting in unnecessarily large deflections.

One might argue that moving Nutting's bench closer to the center of the base would reduce the span between arms 16 in the vicinity of the leg and, in turn, reduce the moment exerted on plate 18. It would be a good argument, except that with some objects such as a computer monitor, for example, where the base is recessed inwardly and away from the monitor sides, the base of the object cannot always be moved to be adjacent to the support base's legs.

And, finally, if Nutting's plate 18 is not made quite thin, namely not thicker than about 0.06", a bench or desk may begin to rock or sustain a permanent distortion.

In Bello's U.S. Pat. No. 4,582,285 the bottom tongue portion of base 48 is positioned under an object for stabilization. If the tongue portion is made very thin so as not to tilt the object it resides under, the entire base 48 would be too weak and would result in a shaky support. If the bottom tongue is made thick enough to resist forces and moments applied by normal use of the invention, it will raise one side of the stabilizing object's base and this was shown above to be undesirable. One could argue that base 48 could be made thick and strong and extend under the entire length and depth of the stabilizing object. It would solve the problem of tilting the object, but it would also require an unnecessarily large and heavy base that is cumbersome and uneconomical as a consumer product. In addition, if, for example, a computer monitor is the stabilizing object for Bello's stand, the bottom tongue of base 48 would have a horizontal portion extending outward of the monitor's base edge and, being subject to bending stresses, would have to be made thicker and unnecessarily heavier.

A similar argument as that presented regarding Bello's invention may be applied to Mease's and Gordon's inventions in which the base stabilizing objects happen to be human.

Based on the above discussion on prior art it can be seen that it would be advantageous to have a base for supports that:

1. Would lend itself to be stabilized by another object's weight,
2. would not significantly distort the other object's shape or design intent, nor cause it to rock,
3. could work with stabilizing objects that have smaller bases than their superstructure without requiring heavier members than necessary, and
4. would adapt to the shape and size of a stabilizing object's base.

SUMMARY OF THE INVENTION

The present invention provides a support base that lends itself to be stabilized by another object's weight. In particular, the invention is so constructed that it works readily with stabilizing objects that have their bases recessed inwards of their superstructure such as computer monitors. It does this by providing two base feet that are pivotally connected, each foot provided with an anchor that is slidably attached to the foot, and each anchor having a very thin tongue that is positioned under the stabilizing object's base. The adjustability of the angle between the two base feet in conjunction with the adjustability of the anchors along the feet allows the base feet to reach under he superstructure of objects having a recessed base, and allows the anchors to be placed at optimal positions under the object. Because the anchors are placed directly adjacent to the object's base, they are subject only to shear and tension stresses and no bending stresses, therefore they can be made razor thin so as not to significantly raise any portion of the stabilizing object's base.

BRIEF DESCRIPTION OF THE DRAWINGS

FIG. 1–FIG. 4 are diagrammatical sketches used for deflection analysis.

DETAILED DESCRIPTION OF THE INVENTION

The following is a relatively detailed description of an article support stand of the invention. Although the article support stand of the present invention is particularly adapted to hold a book or paper copies for use with a computer monitor, it should be understood by the reader that the invention is also adaptable to hold a variety of visual material such as loose sheets of paper, index cards and ring-bound loose-leaf sheets.

Figure 5:
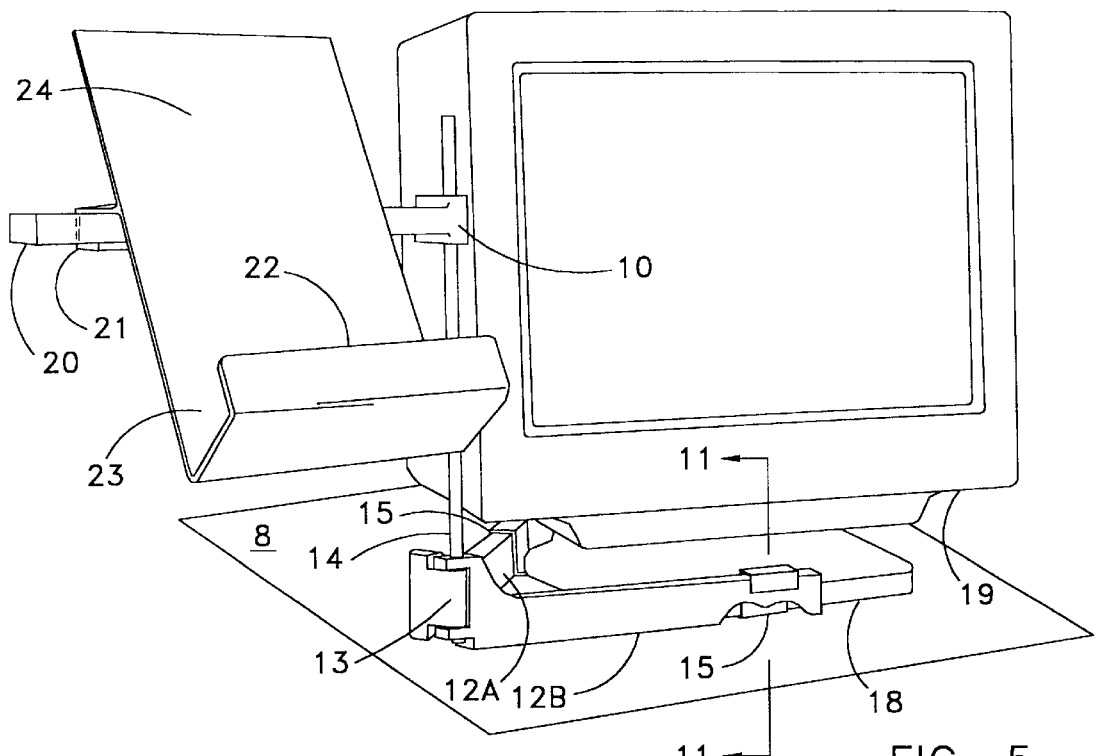
FIG. 5 is a perspective view of the preferred embodiment of the invention.

Referring to FIG. 5, feet 12A and 12B of the article support stand are shown tucked substantially underneath a computer monitor 19. Feet 12A and 12B, resting on surface 8, are pivoted around upright post 14 at their intersection 13. The pivoting region 13 of the support stand feet, as well as post 14, protrude only a small amount from the underside of monitor 19 when viewed from above. This protrusion is just enough to provide the space needed for the pivoting end 10 of horizontal beam 20. The distance from the monitor to post 14 is about 1" to 1½".

Post 14 is inserted into holes in feet 12A and 12B and extends upwards up to about 2" to 3" below the top of the monitor 19. Post 14 has a sliding fit in the feet holes so that it can be shipped as a separate piece and easily assembled by the user. In other embodiments post 14 may be pressed fit into at least one of the feet, or it could be secured with set screws therein. Beam 20 pivots around post 14. Beam 20 is in provided with a thicker portion at joint 10 in order to reduce local stresses at the joint. A frictional element, such as an O-ring for example, is provided inside joint 10 of the beam so that it never slips down the post on its own. When a weight is applied to beam 20, joint 10 resists the moment created by the weight, and this resisting moment provides a locking action on joint 10 so that the beam 20 cannot slide downwards. However, an upward or downward force applied directly at the joint 10 does not create such a locking action, and the beam 20 may be manually positioned at any height by pushing upward on joint 10.

Figure 8:
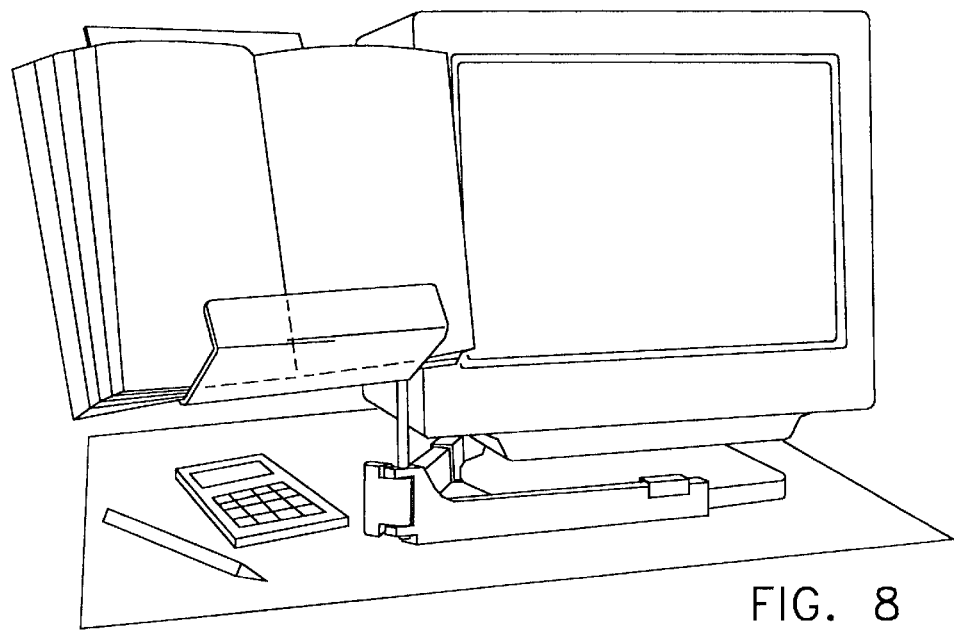
FIG. 8 is a perspective view of the article support stand holding a book adjacent to a computer monitor.

Article holder 24 is moveable along a horizontal beam 20 by means of a sliding connector 21 attached to the rear thereof. This sliding connector 21 allows the book holder 24 to be positioned horizontally at a convenient position for the user. Article holder 24 has a U-shaped receptacle 23 to accept reference materials of all kinds including an open book as shown in FIG. 8. Lip 22 of the article holder 24 holds the pages of a book in an open position. In the preferred embodiment of the invention the entire article holder 24 is made out of a transparent material so that the text behind lip 22 of the holder is readable. However, most of article holder 24 may be manufactured out of a non-transparent material, providing only a transparent front lip for visibility. The article holder 24 is tilted at an angle of between 20 to 30 degrees for viewing comfort. In other embodiments of the present invention the tilt angle of the article holder 24 could be made adjustable. If desired, a clip may be provided adjacent to the top of the article holder 24 to hold loose-leaf sheets. Such a clip would be useful especially in a windy environment or in an office where fans are used for cooling; the clip would prevent the loose sheets from being blown off the holder.

Figure 11:
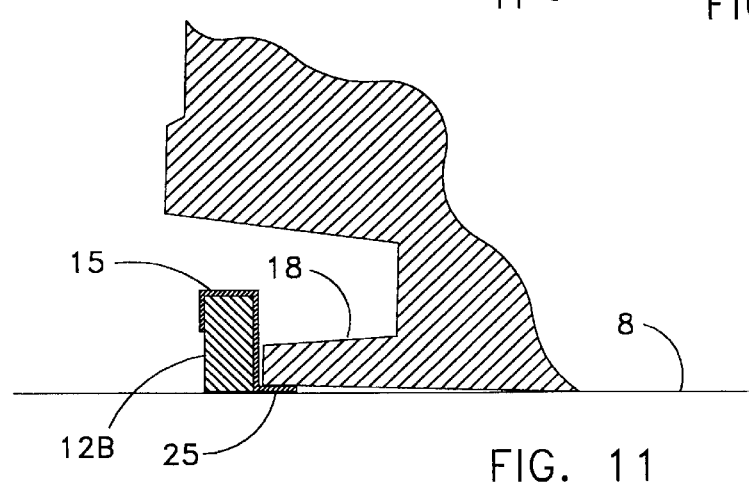
FIG. 11 is a partial cross-sectional view of FIG. 5 through the bookstand foot, its anchor and the monitor base.

In order to prevent the bookstand from toppling over, anchors 15 are provided which are slidably attached to each of feet.12A and 12B and have a thin tongue 25 that is tucked under monitor base 18 as shown in FIG. 11. The top of anchors 15 form a channel that slides along feet 12A and 12B. The weight of the monitor holds down the bookstand via anchors 15 which, in turn, lock down each of feet 12A and 12B. Anchor 15 is made out of very strong and very-thin steel—something approaching the likes of razorblade in material and thickness. Anchor 15 must be made very thin so that when it is tucked under a monitor base, it will not significantly distort the monitor base flatness and will not interfere with its functioning.

Figures 6, 7:
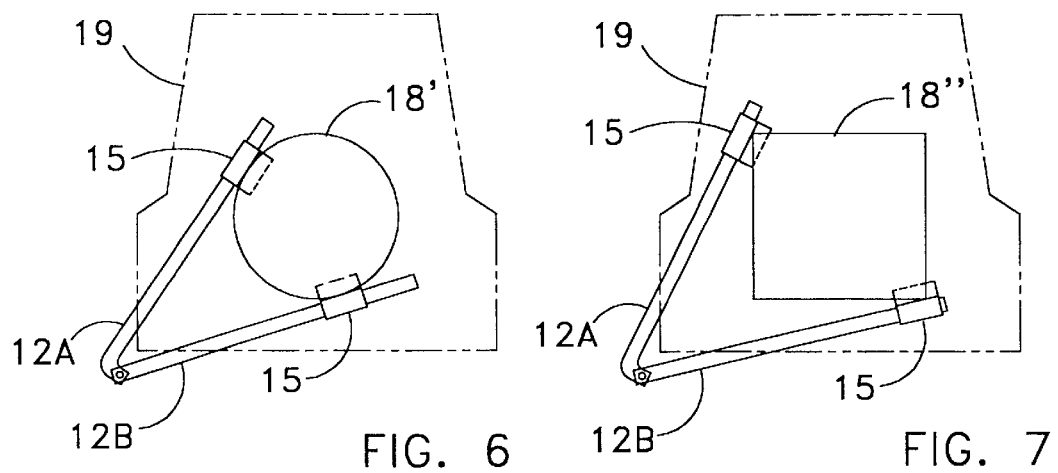
FIG. 6 shows the feet of the article support stand working around a circular monitor base.
FIG. 7 shows the feet of the article support stand working around a rectangular monitor base.

FIG. 6 and FIG. 7 show how feet 12A and 12B in conjunction with anchors 15 are adaptable to work with a variety of monitor base sizes and shapes. Feet 12A and 12B are pivoted inwards until they contact the monitor base. Then anchors 15 are simply slid along the feet up to the point where the feet contact the monitor base, and tongues 25 of the anchors are tucked under the monitor base. FIG. 6 shows the feet and anchor positions around a circular base, and FIG. 7 shows the feet and anchor positions around a rectangular monitor base.

Figure 9:
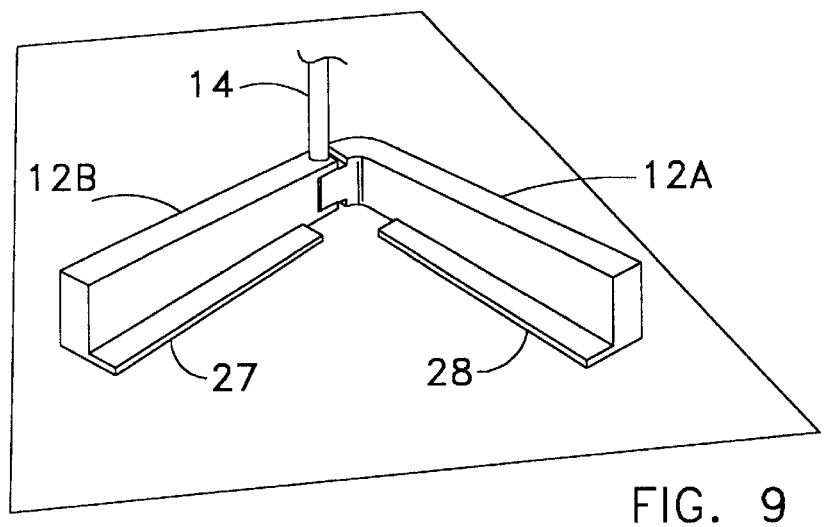
FIG. 9 shows the feet of the article support stand having integral thin protruding tongues.

In another embodiment of the present invention, shown in FIG. 9, feet 12A and 12B are provided with integral tongues 27 and 28 facing inwards towards each other. With today's plastic technology it is possible to obtain very strong, yet very thin plastic sections, thus tongues 27 and 28 could be molded out of plastic as integral parts of feet 12A and 12B, and have dimensions of about 0.02" thick and 0.30" wide.

In other embodiments of the invention anchors 15 could be screwed or clamped onto feet 12A and 12B at the most optimal position for a particular monitor setup.

Figure 10:
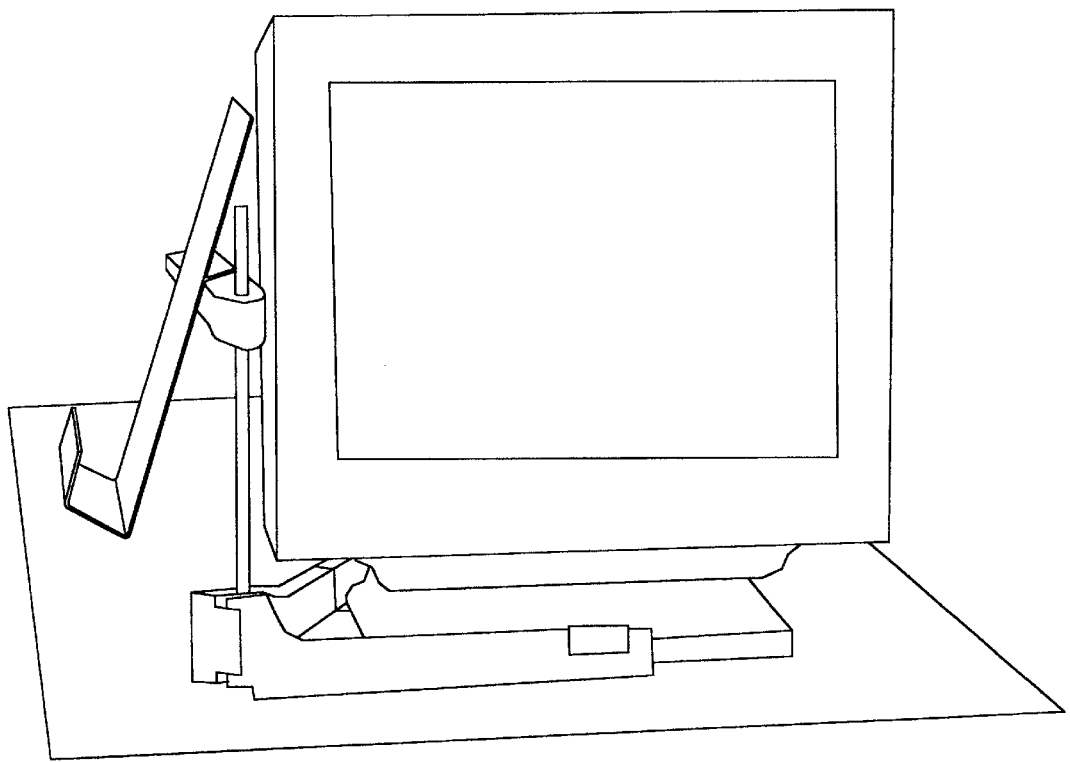
FIG. 10 shows the article holder swerved out of the way when not in use.

Article holder 24 is elevated above the surface 8 of a desk or table, so that the space underneath the article holder 24 is available for any other office paraphernalia. FIG. 8 shows the article holder holding an open book while other desktop items reside directly underneath the article holder. The portion of the article support stand that occupies additional desk space over that already occupied by the monitor is very small and is around 1%–2% of the monitor footprint. The article support stand may be positioned on the left or right side of the monitor. When the article holder is not in use it can be easily swerved out of the way as shown in FIG. 10.

Modifications of this invention will be readily apparent to those skilled in the art and it is intended that the invention be not limited by the embodiments disclosed herein but that the scope of the invention be defined by the appended claims.

What is claimed is:

1. An article support stand comprising:
    (a) two elongated members attached to each other by at least one pivot forming a base resting on a surface, each of said two elongated members having a top side and a bottom side;
    (b) a thin tongue fixedly extending from the bottom side of each of said two elongated members, each of said thin tongues having a thickness less than the thickness of each of said two elongated members, whereby, when each of said thin tongues is inserted under a support member for an object of sufficient weight resting on a surface, said support stand is able to resist moments about axes substantially parallel to said surface;
    (c) a substantially vertical member attached to said base;
    (d) a substantially horizontal beam attached to said vertical member; and
    (e) an article holder attached to said beam.

2. The article support stand of claim 1 wherein said horizontal beam is pivotable around said vertical member.

3. The article support stand of claim 1 wherein said horizontal beam is slidable along said vertical member.

4. The article support stand of claim 1 wherein said article holder is slidable along said horizontal beam.

5. The article support stand of claim 1 wherein said article holder is angularly adjustable around said horizontal beam.

6. The article support stand of claim 1 wherein said vertical member is around post serving also as one of said pivots.

7. The article support stand of claim 1 wherein said article holder is made of a transparent material.

8. The article support stand of claim 1 wherein said article holder supports a book or paper copy.

9. An article support stand resting on a surface, said support stand comprising:
- (a) two elongated members pivotally attached to each other at one of their ends, each of said two elongated members having a longitudinal length, a top surface and a bottom surface;
- (b) an anchor longitudinally slidable along the longitudinal length of each of said two elongated members, each of said anchors having a substantially flat tongue which has a thickness less than the thickness of each of said two elongated members and which is substantially co-planar with the bottom surface of each of said two elongated members, whereby, when each of said substantially flat tongues is inserted under a support member for an object of sufficient weight resting on said surface, said support stand is able to resist moments about axes substantially parallel to said surface;
- (c) a substantially vertical post being the pivot of said two elongated members;
- (d) a substantially horizontal beam attached to said post; and
- (e) an article holder attached to said horizontal beam.

10. The article support stand of claim 9 wherein said horizontal beam is pivotable around said post.

11. The article support stand of claim 9 wherein said horizontal beam is slidable along said post.

12. The article support stand of claim 9 wherein said article holder is slidable along said horizontal beam.

13. The article support stand of claim 9 wherein said article holder is angularly adjustable around said horizontal beam.

14. The article support stand of claim 9 wherein said article holder is made of a transparent material.

15. The article support stand of claim 9 wherein said article holder supports a book or a paper copy.

16. The article support stand of claim 9 wherein each of said anchors has an L-shaped portion attached to said substantially flat tongue.

17. An article support stand resting on a surface, said support stand comprising:
- (a) two elongated members pivotally attached to each other at one of their ends, each of said two elongated members having a longitudinal length, a top surface and a bottom surface;
- (b) an anchor longitudinally slidable along the longitudinal length of each of said two elongated members, each of said anchors having a substantially flat tongue which has a thickness less than the thickness of each of said two elongated members and which is substantially co-planar with the bottom surface of each of said two elongated members, whereby, when each of said substantially flat tongues is inserted under a support member for an object of sufficient weight resting on said surface, said support stand is able to resist moments about axes substantially parallel to said surface;
- (c) a substantially vertical post being the pivot of said two elongated members;
- (d) a substantially horizontal beam pivotally attached to said post and slidable thereon; and
- (e) an article holder slidably attached to said horizontal beam.

18. The article support stand of claim 17 wherein said article holder is made of a transparent material.

19. The article support stand of claim 17 wherein said article holder supports a book or a paper copy.

20. The article support stand of claim 17 wherein each of said anchors has an L-shaped portion attached to said substantially flat tongue.

* * * * *